June 18, 1946.  P. J. S. ENGER ET AL  2,402,321
DEVICE FOR THE TRANSFORMATION OF MATHEMATICAL FUNCTIONS
Filed July 16, 1943  4 Sheets-Sheet 1

INVENTORS
J. S. ENGER
A. PARSCHIN
BY
ATTYS.

Patented June 18, 1946

2,402,321

UNITED STATES PATENT OFFICE 2,402,321

DEVICE FOR THE TRANSFORMATION OF MATHEMATICAL FUNCTIONS

Per Johan Samuel Enger and Alexander Parschin, Stockholm, Sweden, assignors to Telefonaktiebolaget L. M. Ericsson, Stockholm, Sweden, a company of Sweden Application July 16, 1943, Serial No. 495,026
In Sweden June 25, 1942

5 Claims. (Cl. 74—1)

The present invention relates to a device for transformation of mathematical functions. It refers particularly to such calculating machines wherein mathematical functions with two or several variables are reproduced in the shape of curve bodies of a mechanical, electrical or other nature, in such a way that certain variables are represented by the movements of a feeler in a certain co-ordinate system related to the curve body, whilst one variable is represented by the deflexion of a mechanical, electrical or other kind which the curve body produces in the feeler. The invention is applicable when the mathematical functions which are reproduced are symmetric or may be transformed into a symmetric form.

The object of the invention is to reduce the dimensions of the curve body without reducing the accuracy of feeling of the variables represented by the curve body. This is obtained by making the curve body reproduce only the branch of the symmetric function which lies on one side of the point of symmetry. Should the incoming variable pass over its entire range, the feeler first passes once over the curve body when one branch has been passed over. At the point of symmetry the feeler turns and passes over the curve body a second time in the opposite direction when the second branch is passed over. The device according to invention should therefore be designed preferably so that a driving device, the position of which represents the instant value of the function to be transformed, determines the position of a driven device, the position of which represents the instant value of the transformed function whereby the driving device consists of two parts connected together in such a way that, one part moving in one direction, the other part moves in the opposite direction, the driven device being arranged to engage upon the part of the driving device which for the moment occupies the most advanced position in a certain direction.

The invention will be described more in detail with reference to enclosed drawings.

Figure 3:
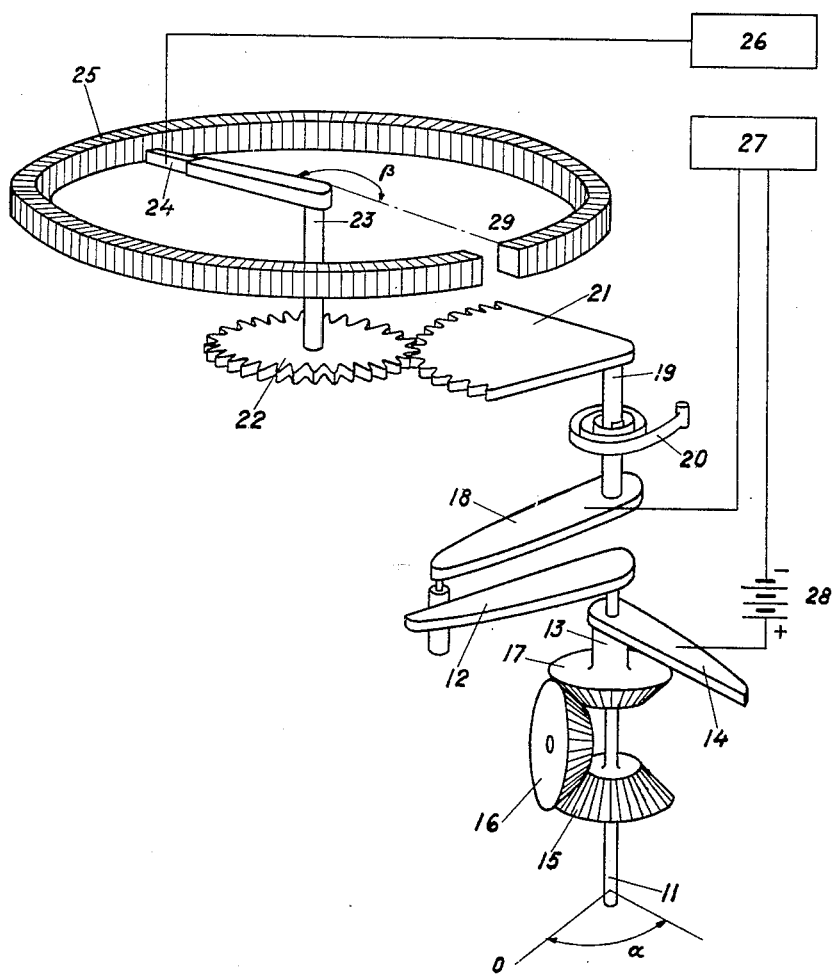

Fig. 3 gives an example of an embodiment of transformation of functions.

Figure 4:
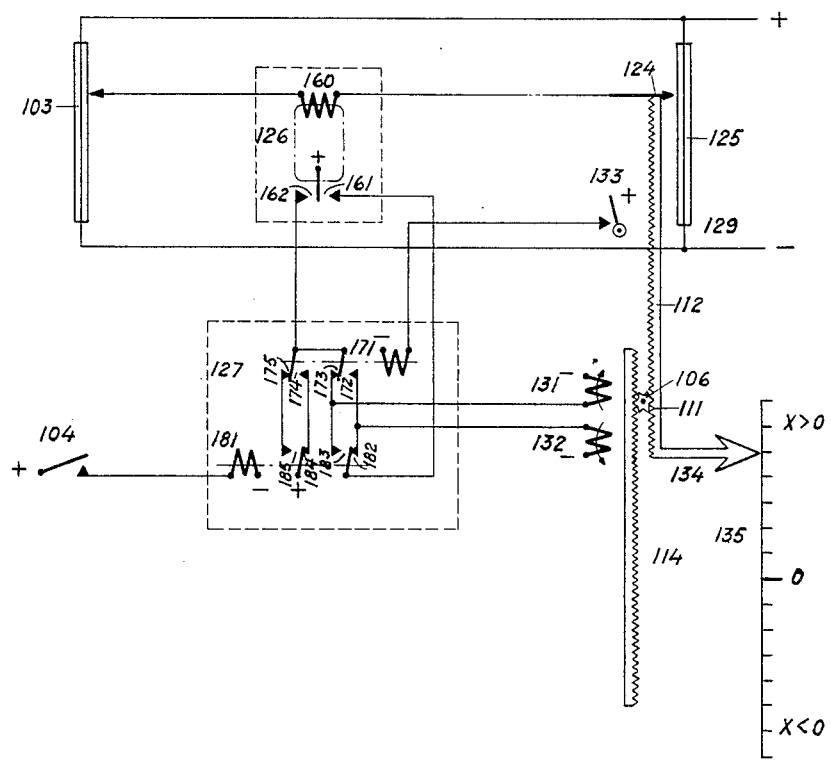

Fig. 4 is a schematic illustration of an example of the arrangement according to Fig. 3 being used as a receiver of a polarly symmetric function.

Figure 5:
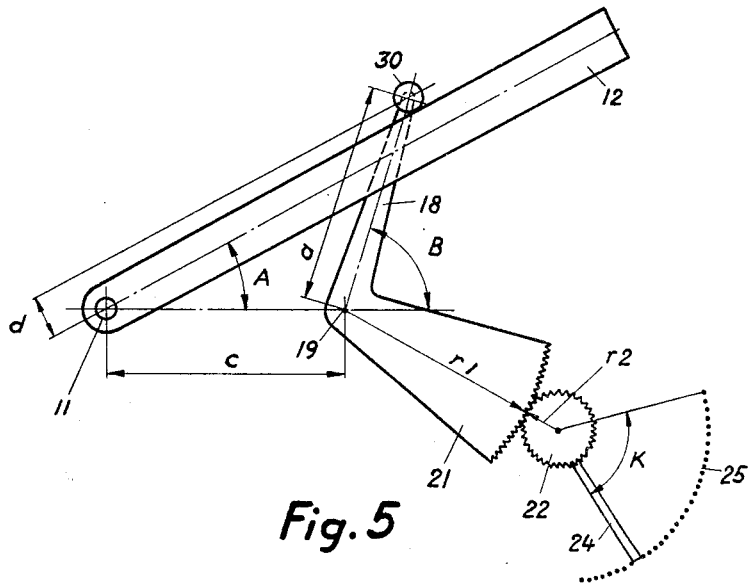

Fig. 5 illustrates an embodiment of a detail of a driving arm on a driving shaft and an arm on a driven shaft in an arrangement for the transformation of functions.

Figure 6:
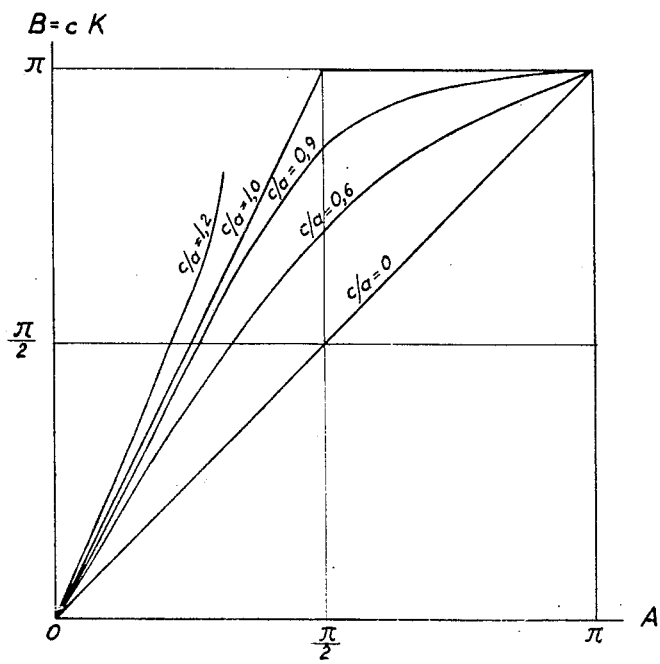

Fig. 6 is a graphic picture of the relation between the movements of the driving and the driven shaft in Fig. 5.

Figure 1:
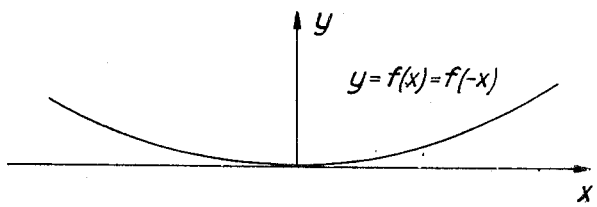
Fig. 1 shows a graphic picture of a linearly symmetric function.

According to Fig. 1, where the mathematical function is linearly symmetric, the two branches of the function are inversely congruent. Origin of co-ordinate axes has been placed in the point of symmetry. Here is $$y=f(x)=f(-x)$$

Figure 2:
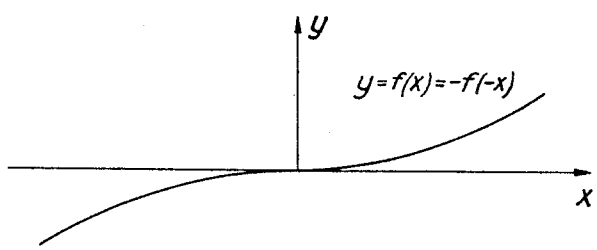
Fig. 2 is a graphic picture of a polarly symmetric function.

The deflection $y$ of a feeler indicates the value of the function on both sides of the line of symmetry. If however the mathematical function is polarly symmetric so that the two branches are directly congruent, as in Fig. 2, where $$y=f(x)=-f(-x)$$

the feeler marks the numerical value of the function but its sign must besides be indicated in a suitable manner.

The components of a device for transformation of functions are illustrated by the example as shown in Fig. 3.

A driving-shaft 11, which supports a driving arm 12, moves concentrically within a hollow shaft 13, which supports a driving arm 14. A gear 15, 16, 17 is so arranged that, when the shaft 11 turns the driving arm 12 in one direction, the shaft 13 turns the driving arm 14 equally as much in the other direction. The turning angle $\alpha$ of the driving shaft 11 is a representation of the incoming variable of the mathematical function. An arm 18, supported by a shaft 19, is by a spring 20 pressed against the driving arms 12 resp. 14. If the driving shaft 11 is turned from the position shown in one direction, for instance clockwise, the driving arm 12 moves the arm 18 in the direction of the driving shaft. If, on the other hand, the driving shaft is turned from the same starting position in the opposite direction, the driving arm 12 moves the arm 18 at first in the same direction as the shaft 11, i. e. counterclockwise. When the shaft 11 has been turned half the angular distance between the driving arms 12 and 14, the driving arm 14 will however move the arm 18 in a direction opposite that of the driving shaft i. e. clockwise. The movement which the arm 18 receives from the driving arms is by the gear wheels 21 and 22 transferred to an arm 23, which supports a sliding contact 24, which moves along a contact row 25. The turning angle of the sliding contact $=\beta$. An electric current source is supposed to be suitably connected to the contact row 25 so that the potential of each individual contact point becomes a certain, desired function of the respective position of the contact point in the contact row. The sliding contact 24 is electrically connected to a receiver 26, and in this way the potential of the contact point on which the sliding contact 24 stands is transferred to the receiver 26. Thus the relationship between the movements of the sliding contact 24 and driving shaft 11 is dependent on the position of the shaft 19 compared to the shafts 11 and 13.

At first, it is assumed, for the sake of simplicity, that the shafts 11, 13 and 19 are concentric. The turning angle of the arm 18 is then equal to the turning angle of the driving arm (12 or 14) against which it is pressed for the moment. In the position where the driving arms 12 and 14 pass each other, i. e. for $\alpha=0$, both arms touch 18 which is just occupying an extreme position in the counter-clockwise direction. The position $\beta=0$ held by the sliding contact 24 along the contact row is also an extreme position and represents the symmetrical value of the function illustrated.

If from the symmetric value as a starting-point the driving shaft 11 is turned a certain arbitrary angle $\alpha$, the sliding contact 24 will be moved counter-clockwise an angle $\beta$, which is proportionate to the numerical value of the turning angle $\alpha$ of the driving shaft 11, regardless of whether the turning of the driving shaft goes clockwise or counter-clockwise. The electric voltage which the contact row conveys to the sliding contact is a function of the angular position $\beta$ of the sliding contact reckoned from the symmetrical point and becomes therefore a linearly symmetric function of $\alpha$, the symmetric value $\alpha=0$.

If the function to be represented is linearly symmetric the tension of the sliding contact represents the value of the function. Should however the function to be represented be polarly symmetric the tension of the sliding contact reppresents the numerical value of the function. Therefore the sign of the function must also be indicated which may be done in the following way:

The positive pole of a current source 28 is connected to the driving arms 14. The arm 18 is connected to a receiver 27 which is also connected to the negative pole of the current source. The receiver 27 is consequently traversed by a current as soon as the arm 18 touches the driving arm 14. Should the arm 18 only touch the driving arm 12, the current flowing through the receiver 27 is interrupted.

The device described may be used (A) as sender (a) of a polarly symmetric function, (b) of a linearly symmetric function, and (B) as receiver of a polarly symmetric function.

These ways of application will now be described.

(A) *Sender*

The variable $x$ contained in the function $y=f(x)$ is represented by the mechanical movement of the driving shaft 11. This movement may be obtained in various ways, for instance through manual setting or by connecting an apparatus which gives the variable $x$ in the shape of a mechanical movement to the driving shaft, either mechanically or by means of a system of trailing scales or by means of a servo-motor.

A certain value $x$ corresponds to a certain position of the driving shaft 11 and thus also to a certain position of the sliding contact. Thus a certain potential will pertain to each value $x$ which potential is sent to the receiver 26. This potential represents the value $y$ corresponding to the value $x$ set for the moment.

(a) For the polarly symmetric function $y=f(x)$ applies $f(-x)=-f(x)$.

The branch of the function which lies on one side of the symmetric value thus numerically equals the branch lying on the opposite side of the symmetric value but it has the opposite sign. As mentioned above the potential which is conveyed from the sliding contact to the receiver 26 illustrates the numerical value of the function. The change of signs which takes place in the function as the symmetric value is passed will be indicated by the receiver 27 being de-energized on one side of the symmetric value but traversed by a current on the other side of the symmetric value.

(b) For the linearly symmetric function $y=f(x)$ applies $f(-x)=f(x)$.

Here the branches of the function on each side of the symmetric value are identical, thus rendering the receiver 27 and its electric connection superfluous.

(B) *Receiver of a polarly symmetric function*

In the Fig. 4 the parts 103 and 104 illustrate a sender arrangement not included in the invention proper which arrangement contains two devices, the one 103 emitting a voltage which represents the numeric value $|y|$ of the variable $y$, the second 104 emitting a voltage representing the sign of the variably $y$. The invention comprises two relay devices 126, 127, one of which 126 receives the valtage, which represents $|y|$, and the other 127 receives the voltage representing the sign of the variable $y$. Below, to the right, an arrangement is shown which emits the variable $x$ in the shape of a mechanical movement.

To make the diagram in Fig. 4 more easily grasped, another embodiment of the invention than the one shown in Fig. 3 has been used, the contact row 125 being linear and the driving arms 112 and 114 with their gear wheels having the shape of straight racks, one of which being for the moment placed topmost and arranged to lift the sliding contact 124 which is pressed down by the force of gravitation. The receivers 126 and 127 control a servo-motor 131, 132, which drives a driving shaft 106 which over a gear device 111 actuates the driving arms 112 and 114. An impulse to the coil 131 resp. coil 132 in the servo-motor turns the driving shaft 106 clockwise resp. counter-clockwise to lower resp. higher values $x_1$, thus causing the sliding contact 124 to move in a corresponding manner and its voltage $y_1$ to change according to the function $y=f(x)$. The electric contact between the driving arm 114 and its arm is shown as a contact 133 which is broken for positive values $y$, i. e. when the driving arm 112 has a position higher than the driving arm 114, and closed for $y \leqq 0$, i. e. when the driving arm 114 is on the same height or higher than the driving arm 112. The driving arm 112 is supposed to actuate a pointer 134 which points to a scale 135 on which the value $x$ may be read.

The receiver 126 is a polarized relay, the coil 160 of which is connected partly to the incoming voltage $|y|$ and partly to the sliding contact 124, the voltage of which may be called $|y|_1$. The coil actuates a contact device 161, 162, the movable contact spring of which is connected to the + pole of a power source. If the voltage of the sliding contact 124 is less resp. higher than the incoming tension, the contact 161 respectively 162 closes. If the two voltages are identical both contacts are broken. The receiver 127 consists of two relays 171 and 181. The coil of the relay 181 is connected to the receiver 104 and the armature of the relay is thus in rest position if $y>0$, but in operating position if $y=0$. The coil in the relay 171 is connected to the contact 133 and the relay armature is thus in rest position respectively operating position according to the position of the driving arms 112 and 114 corresponding to $y_1>0$ respectively $y_1 \leq 0$. The operating manner is as follows:

(I) For values $x>0$. The sender 104 does not emit current, wherefore the armature of relay 181 remains in rest position.
  (1) The receiver has the value $x_1>0$. The sliding contact is supported by the driving arm 112, the contact 133 is broken and the arma- of relay 171 has rest position. If the voltage $|y|_1$ of the sliding contact 124 has a higher respectively lower value than the tension $|y|$ originating from the sender 103, viz.

$$|y|_1 > |y| \text{ respectively } |y|_1 < |y|$$

current passes through the relay coil 160 in the direction of respectively from the sliding con-contact 124. The contact 162 respectively 161 is then closed and the contacts 162—173 respectively 161—182 are energized, whereby the servo-motor 131 respectively 132 drives the shaft 106 clockwise respectively counter-clockwise. The driving arm 112 is lowered respectively raised, whereby the voltage $|y|_1$ of the sliding contact 124 falls respectively rises, up to $|y|_1 = |y|$. The relay 160 then becomes deenergized, the contact 162 respectively 161 is broken and the servo-motor stops. The receiver has then the position $x_1=x$, corresponding to $y_1=y=f(x)$.
  (2) The receiver has a value $x_1 \leq 0$. The contact is supported by the driving arm 114, the contact 133 is closed and the armature of relay 171 has operating position. Regardless of the voltage of the sliding contact 114 and the condition of the relay 160 a current passes from the contact spring 185 connected with the + pole of the current source, over 174, 172, to the coil 132, whereby the servo-motor 131, 132 drives the shaft 106 counter-clockwise. The driving arm 114 is lowered. When the sliding contact has reached the extreme position 129 it is lifted by the driving arm 112 and leaves the driving arm 114. At the same time the contact 133 is broken, the relay 171 falls and the procedure continues according to the case (I1) until the correct $x_1$ value, $x_1=x$ has been reached.

(II) For values $x \leq 0$. The sender 104 emits a current to the relay 181 which lies with its armature energized.
  (1) The receiver has the value $x_1 \leq 0$. The sliding contact is supported by the driving arm 114, the contact 133 is closed, the armature of relay 171 is energized. If the voltage $y_1$ of the sliding contact has a higher respectively lower value than the voltage $|y|$ deriving from the sender 103, viz. $|y|_1 > |y|_1 < |y|$, a current passes through the relay coil 160 in the direction from respectively to the sliding contact 124. Then the contact 162 respectively 161 is closed and current passes over the devices 162—172—132 respectively 161—183—131, whereby the servo-motor 132 respectively 131 drives the shaft 106 counter-clockwise respectively clockwise. The driving arm 114 is lowered respectively raised whereby the voltage $|y|_1$ of the sliding contact 124 decreases respectively increases till $|y|_1 = |y|$. The relay 160 now is de-energized, the contact 162 respectively 161 is broken and the servo-motor stops. The receiver has then a position $x_1=x$ corresponding to $$y_1 = y = f(x)$$

(2) The receiver has the value $x>0$. The sliding contact is supported by the driving arm 112, the contact 133 is broken and the relay 171 is de-energized. Irrespective of the voltage of the sliding contact 124 and the condition of relay 160 a current passes from the contact spring 185 over the devices 175, 173 to the contact 131, whereby the servo-motor drives the shaft 106 clockwise. The driving arm 112 is lowered. When the sliding contact has reached the extreme position 129 it is lifted by the driving arm 114. Simultaneously the contact 133 is closed, relay 171 attracts and the procedure continues according to the case (II1), until the correct value $x_1, x_1=x$, has been attained.

A closer description of the relationship between the movements of the sliding contact 24 and those of the shaft 11 will now be given on the basis of Fig. 5 which shows a modified detail of the device according to Fig. 3.

The driving shaft 11 which supports the driving arm 12 moves concentrically within the shaft 13 as shown in Fig. 3. The shaft 13 carrying the driving arm 14 is however not represented in Fig. 5. The shafts 19 and 11 in Fig. 5 are, contrary to the corresponding shafts in Fig. 3, not concentric but situated at a distance $c$ from each other. The arm 18 with the length $a$ is placed on the shaft 19, as is also the gear wheel 21 which drives the gear wheel 22 which supports the arm with the sliding contact 24. The sliding contact runs along the contact row 25 which is composed of a great number of close-lying and uniformly spaced metallic contacts.

The arm 18 supports at its free end a roller 30. A spring 20 which is not shown in Fig. 5 tends to turn the arm 18 so that the roller 30 is pressed against the driving arm 12. The end point of the arm 18 will thus continuously be on a straight line parallel to the active edge of the driving arm. The space between this line and the driving shaft 11 is indicated by $d$.

In the drawings, $A$ signifies the angle between the active edge of the driving arm 12 and the connecting line between the shafts 11 and 19. $B$ is the angle between arm 18 and the prolongation of the said connecting line. $K$ represents the position of the sliding contact 24 reckoned from the position it holds when $B=0$, viz. when the arm 18 lies in the prolongation of the connecting line between the shafts 11 and 19.

$r_1$=the pitch radius of the gear wheel 21,
$r_2$=the pitch radius of the gear wheel 22,
$k_1$=the number of contact steps per angular unity of $K$ and
$n$=the total number of contact steps reckoned from the extreme position.

Now it is $$\frac{a}{\sin A} = \frac{c + \frac{d}{\sin A}}{\sin (B-A)}$$

$$n = k_1 K = k_1 \cdot \frac{r_1}{r_2} B$$

In Fig. 6 is shown $$B = \frac{r_2}{r_1}$$

as a function of $A$ for different values of $c/a$, when $d=0$.

For $$\frac{c}{a} = 0$$

viz. when the shaft 19 is concentric to the shaft 11, a constant relation exists $K/A$. When $$1 > \frac{c}{a} > 0$$

the relation $K/A$ has its highest value for $A=0$. When $A$ increases $K/A$ decreases first slowly and then quickly. For $$A = \frac{\pi}{2}$$

the change in $K/A$ is greatest. $K/A$ attains by $A=\pi$ its lowest value. The arrangement thus causes a gearing between driving shaft and sliding contact which is not constant but has a different value for different values of $A$. The angular change in $A$ corresponding to the progress of a contact step on the contact row thus varies with $A$.

If the arrangement is used as a receiver of a function which is illustrated in the shape of an electric voltage and the contact row has the shape of equally spaced, separate contact points, an adjustment cannot take place with a greater accuracy than half a contact space. If the right potential for which the apparatus is to be adjusted, lies between the potentials of two adjacent metallic contacts, the sliding contact may attain the potential of one or the other of these metallic contacts by touching one of them. Possibly, by touching both simultaneously, it may attain a certain potential which lies somewhere between the potentials of both metallic contacts, but any further adjustment to the right potential is not possible.

Since the accuracy of adjustment of the sliding contact is limited by the size of the contact step, the adjustment accuracy of the driving shaft will thus be limited to the angle which corresponds to the movement of one contact step of the sliding contact. The accuracy of the adjustment of the contact arm 24 is constant and equals one (or possibly a half) contact step. The relation in the adjustment of the contact arm 24 and the driving arm 12 fluctuates with $A$ and consequently the accuracy of adjustment for the driving arm will vary with $A$. $A$ is thus set with various accuracy within different parts of its field.

If a limited number of metallic contacts may be disposed of, it may occur that the variable to be illustrated embraces such a large range that the accuracy which is obtained at the setting to within one contact step does not suffice if the accuracy of adjustment be made constant over the entire range. The transformation of the variable offered by the described arrangement may then be used to ensure a greater accuracy within a part of the range by reducing the accuracy within other parts of the range.

The transformation may be adapted to the requirements placed on the distribution of accuracy by the possibility firstly to adapt the relation $c/a$, secondly to choose suitable limits for the movement of the driving arms (i. e. $A_{max} > A > A_{min}$.)

and simultaneously to adapt the gearing ratio $$\frac{r_1}{r_2}$$

to a suitable value.

If the mathematical function is of a nature admitting the regrouping of the accuracy, the arrangement offers a gain because, if it be tried to illustrate the function without making use of the possibility of transformation, it would be necessary to maintain the required maximum accuracy over the entire range which would entail that the number of metallic contacts must be larger than when using a fluctuating accuracy.

The object of the invention may naturally be gained by using other means of executing the transformation wherefore the invention is not limited solely to the arrangement described.

We claim:

1. An apparatus of the character described comprising a driving device, a driven device, the position of the driving device representing the instant value of the function to be transformed, and the position of the driven device determining the instant value of the function transformed, said driving device including two relatively movable members and means connecting the said members whereby they are caused to move in opposite directions, said driven device including a member engaged and operated by one of said two relatively movable members which at the moment occupies the most advanced position in a certain direction.

2. An apparatus as claimed in claim 1 in which the driving device also includes two concentrically arranged shafts rotatable in opposite directions and supporting said relatively movable members.

3. An apparatus as claimed in claim 1 wherein said relatively movable members are constituted by racks moved in opposite directions by said connecting means.

4. An apparatus as claimed in claim 1 wherein said relatively movable members are constituted by arms supported on concentrically arranged shafts and wherein the last mentioned member is constituted by an arm mounted on a shaft disposed concentrically with respect to the first mentioned shafts.

5. An apparatus as claimed in claim 1 wherein said relatively movable members are constituted by arms supported on concentrically arranged shafts and wherein the last mentioned member is constituted by an arm mounted on a shaft disposed excentrically with respect to the first mentioned shafts.

PER JOHAN SAMUEL ENGER.
ALEXANDER PARSCHIN.